Aug. 30, 1932.  E. L. FORSHEE  1,875,230
CHICKEN FEEDER
Original Filed June 17, 1929  2 Sheets-Sheet 1
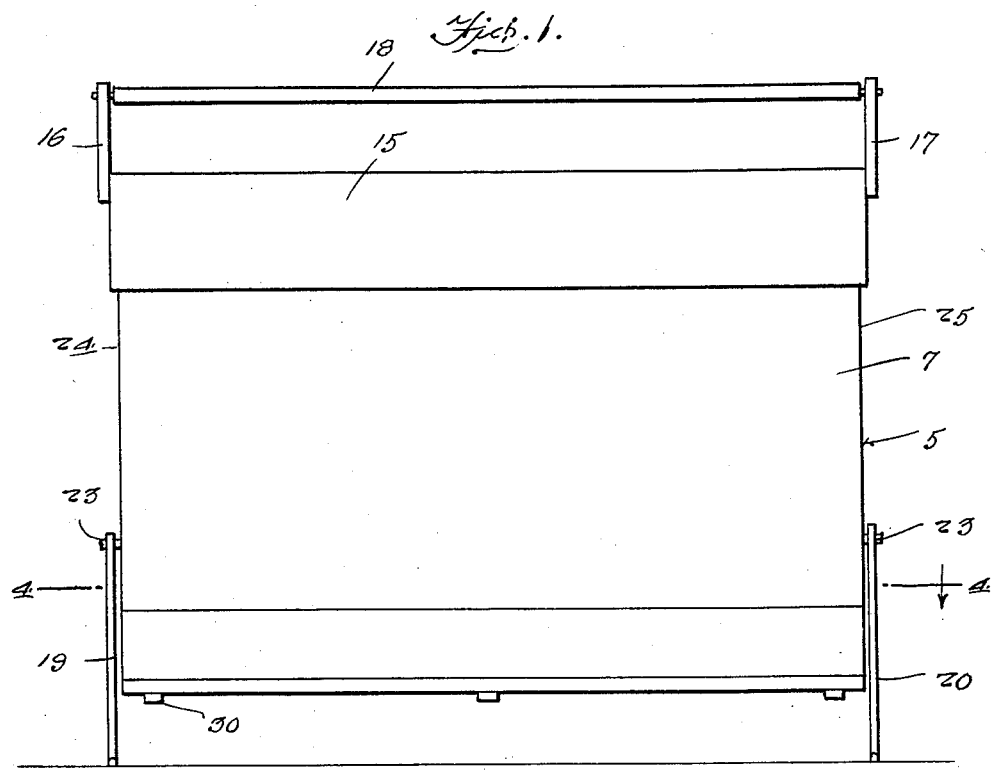
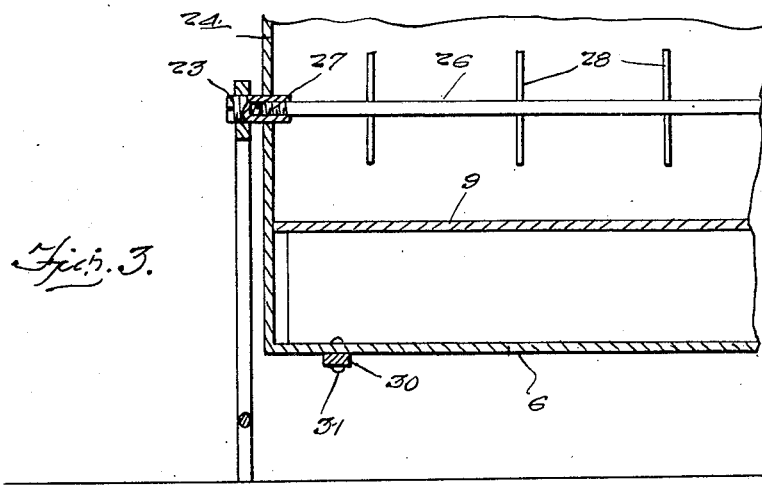
Inventor
Ernest L. Forshee
By Clarence A. O'Brien
Attorney

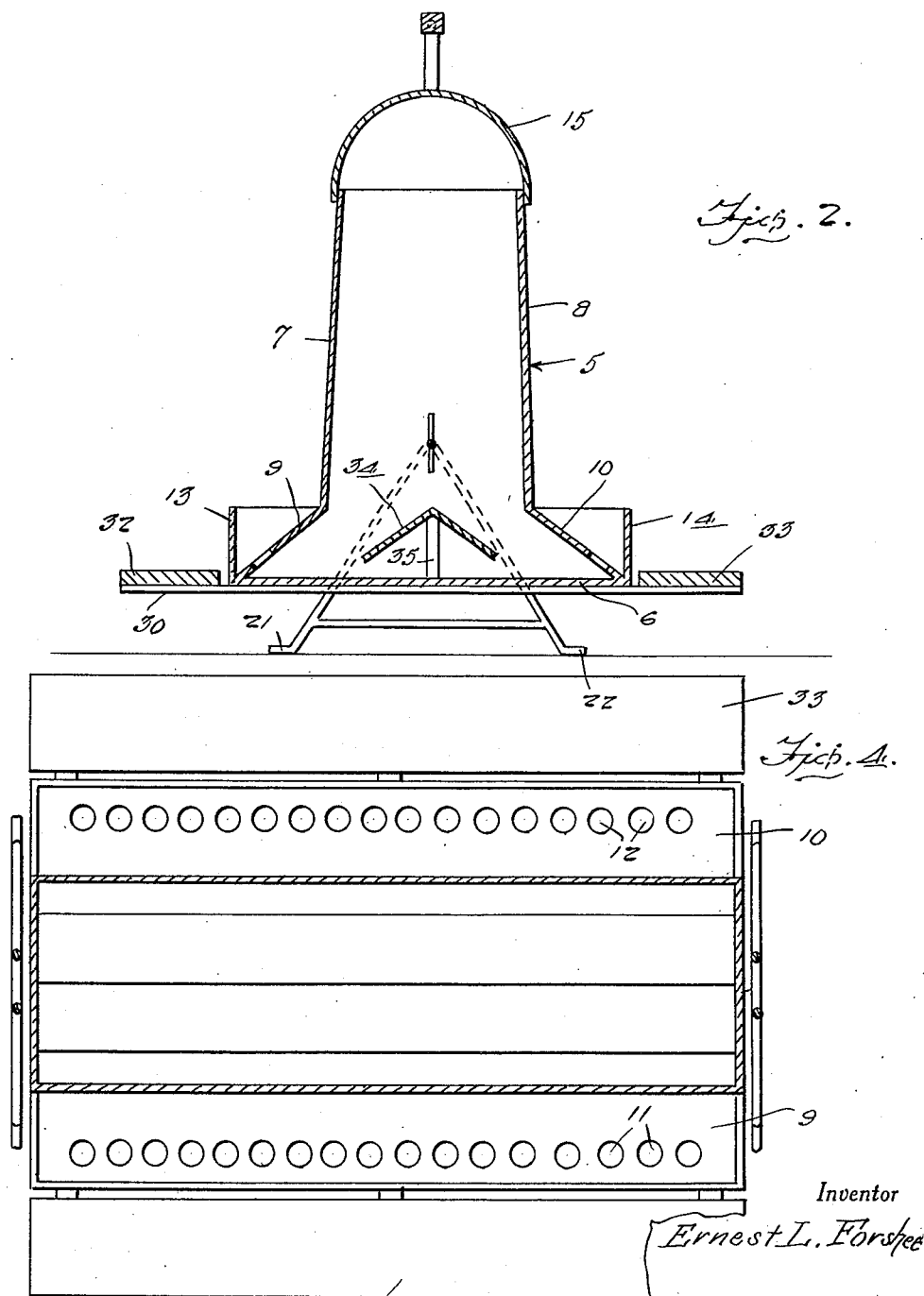

Patented Aug. 30, 1932

1,875,230

UNITED STATES PATENT OFFICE

ERNEST L. FORSHEE, OF AKRON, MICHIGAN

CHICKEN FEEDER

Application filed June 17, 1929, Serial No. 371,592. Renewed July 12, 1932.

This invention relates to chicken feeders and an object of the invention is to provide a receptacle which will automatically urge food within reaching distance of the fowl being fed and at the same time will prevent fowls from entering the compartments or otherwise injuring the food therein.

Another object of the invention is to require the fowl to stand upon a portion of the device, whereupon the food will be urged thereby within reach of the fowl. Further objects of the invention are to provide a device of the character referred to, which will prevent roosting of the fowls thereon, that is, strong, compact and durable, very simple in its method of assembly, having very few parts to become out of order and comparatively inexpensive to manufacture.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, modifications and variations may be resorted to, without departing from the spirit of the claims hereunto appended.

In the drawings, wherein like reference characters denote corresponding parts throughout the several views:

Figure 1 is a side elevation of the device, in accordance with this invention.

Figure 2 is a transverse detailed section thereof.

Figure 3 is a fragmentary section of one corner of the device, illustrating the rocking movement of the agitator, and Figure 4 is a longitudinal horizontal section taken substantially on the line 4—4 of Figure 1, and looking in the direction of the arrow.

Referring to the drawings in detail, 5 indicates generally a food hopper having a base 6 of materially greater width than the width of the hopper. The side walls 7, 8, of the hopper, adjacent the lower ends thereof are flared out as at 9, 10, to a point where they merge with the base 6. The length of the hopper is materially greater than the width thereof and the flared portions 9, 10, are provided with a plurality of longitudinally extending spaced apertures 11, 12, on each of the flared portions whereby access may be gained to the interior of the compartment to feed the fowl.

The base 6 is normally disposed on a horizontal line. Flanges 13, 14, project vertically above the opposite longitudinal sides of the hopper from points where the flared portions 9, 10, merge with the base 6. The flanges 13, 14, prevent the fowl from getting in and making droppings through the openings 11, 12, and the flared portions of the hopper. The upper end of the hopper 5 is open, and a substantially arcuate cover 15 is supported by frictional engagement of its lower edges with the upper edges of the end and side walls of the hopper 5. By having the cover arcuate, and in connection with the whirler to be presently mentioned, the fowl are prevented from roosting upon the cover or top of the hopper 5. At the ends of the cover 15 are secured a pair of vertically extending arms 16, 17, on the upper ends of which are journalled a rotatably mounted whirler or rod 18. When the fowl alight upon the whirler 18, it will be rotated whereby the fowl will lose its balance and consequently will not be permitted to roost upon the top of the hopper 8. The rod or whirler 18 is constructed so that the fowls will not be able to balance themselves upon it. A pair of supports 19, 20, of triangular configuration, rockably support the hopper 5 in a manner to be presently described, the opposed legs of the triangle at each end of the hopper being provided with outwardly projecting flanges 21, 22, which form a firm support with respect to the ground. It is to be understood that each of the triangular supports are formed with flanges 21, 22. Triangular supports 19, 20, at the apices thereof, each have internally threaded sockets 23, rigidly secured thereto, and extending through the opposite ends 24, 25 of the hopper in alignment with each other, along the longitudinal median of the hopper. The openings through which the sockets 23 extend permit the hopper to rock upon the sleeve and the weight of the fowl rests upon the hopper in a manner presently to be described. A rod 26 has its opposite ends 27 in threaded engagement with the threaded socket 23 and having peripheral threads on the opposite end walls of said socket, whereby the said rod 26 is rigidly supported in the socket. A plurality of longitudinally extending prongs 28 are secured to and project from the opposite side of the rod 26 so as to extend into the feed in the hopper and when the hopper is rocked on the sockets 23 as an axis, said prongs will loosen the feed and force the same through the base 6. A plurality of transversely extending longitudinally spaced ducts are secured to the base 6 by means of rivets and the ends thereof project laterally from the sides of the hopper 5. A pair of platforms 32, 33 are secured to the laterally projected ends of the strips 30 and provide a place for the fowl to rest when it desires to acquire food through the openings 11, 12. The platforms 32, 33 are disposed along the sides of the hopper 5 and when the fowl rests upon either of them, the hopper will be rocked upon the socket 23 as an axis and the prongs 28 will force food outwardly in the neighborhood of the flared portions 9, 10 of the hopper.

An inverted V shaped plate 34 extends along the longitudinal median of the interior of the hopper for the entire length thereof and is supported on its opposite ends by vertically disposed brackets 35. The plate 34 acts to direct the food toward the longitudinal edges of the hopper when the agitating rods 26 move the feed outwardly by the rocking movement of the hopper 5.

It is to be noted in connection with this invention that the fowl will not be permitted to roost upon the top of the hopper 5 by reason of the arcuate top 15, the whirler 18, and also by reason of the fact that the hopper itself is rockable along its longitudinal axis.

The hopper 5 is spaced from the ground at such a distance that while the hopper is permitted to rock upon its axis, the platforms 32 or 33 will engage with the ground in angular relation thereto so that the hopper will not be completely rotated, whereby an upsetting of the hopper is prevented.

What is claimed is:

1. A poultry feeder comprising a pair of uprights, a member having its ends connected with said uprights, a combined hopper and feed pan, the pan having side walls extending around the lower part of the hopper, and said lower art of the hopper having openings therein, the member passing through the lower part of the hopper and forming a pivotal support for the hopper, and prongs on the member within the hopper for agitating the feed in the hopper as the same is rocked on the member.

2. A poultry feeding device comprising a pair of uprights, an internally threaded socket member in the upper end of each upright, a hopper having holes in its end walls through which the socket members extend to form trunnions for the hopper, an agitator rod having its ends threaded in the members and located in the hopper, projections on said rod for agitating the feed in the hopper when the hopper is rocked, a feed pan connected with the lower end of the hopper, and said lower end of the hopper having openings therein for enabling poultry to reach the feed in the hopper.

3. A poultry feeder comprising a hopper having openings in its lower end, a feed pan connected with the bottom of the hopper and having its side walls extending around the part of the hopper which is provided with the openings, a pair of uprights, a member having its ends connected with the upper ends of the uprights and passing through the hopper, said member forming a pivotal support for the hopper, prongs on the said member located in the hopper to agitate the feed in the hopper when the hopper is rocked, and platforms connected with the pan at opposite sides thereof, whereby a fowl jumping on a platform will cause the hopper to tilt.

In testimony whereof I affix my signature.

ERNEST L. FORSHEE.